Patented Apr. 24, 1945

2,374,589

UNITED STATES PATENT OFFICE 2,374,589

ABRASION-RESISTANT SYNTHETIC RUBBER

Robert R. Dreisbach, Midland, Mich., assignor to The Dow Chemical Company, Midland, Mich., a corporation of Michigan No Drawing. Application December 17, 1941, Serial No. 423,295

16 Claims. (Cl. 260—66)

This invention concerns certain new rubberlike products which are exceptionally resistant to abrasion.

The new rubber-like products comprise a conjugated diolefine, a 2-($\Delta$1)-alkenyl-aromatic compound and an alpha-beta unsaturated ketone having the general formula:

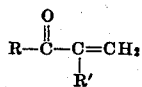

wherein R represents an alkyl radical and R' represents hydrogen or an alkyl radical, which compounds are polymerized together in the proportions of between 37 and 65 per cent by weight of the diolefine, between 20 and 60 per cent of the ketone and between 1 and 30 per cent of the 2-($\Delta$1)-alkenyl-aromatic compound.

We have found that these co-polymers are readily prepared by ordinary polymerization procedure and that they may be compounded with usual rubber-compounding agents and cured to obtain finished rubber-like products of good softness, tensile strength and elasticity and which are exceptionally resistant to wear by abrasion. In most instances the cured products are considerably more resistant to abrasion than is natural rubber which has been similarly compounded and cured. Accordingly, the products may advantageously be used in forming the walls or lining of ball mills or in making tires and other rubberlike articles which are to be subjected to abrasive conditions.

However, in order to obtain such abrasion-resistant products, it is important that the proportions of the three essential polymerizable compounds chemically combined in the product be restricted to those given above. When the proportion of any of these ingredients is varied so as to approach closely or fall outside of these limits, the abrasion resistance of the product decreases sharply. The essential polymerizable compounds are preferably employed in the proportions of between 38 and 60 per cent by weight of the diolefine, between 5 and 25 per cent of the 2-($\Delta$1)-alkenyl-aromatic compound and between 25 and 45 per cent of the unsaturated ketone. The products obtained by co-polymerizing the ingredients in these preferred proportions are especially resistant to abrasion when compounded and cured.

Examples of conjugated diolefines which may be employed in preparing the products are butadiene-1.3, isoprene, 2-ethyl-butadiene-1.3, 2.3-dimethyl-butadiene-1.3, etc. Butadiene is preferred since it is the least expensive and most readily available of the diolefines.

Examples of 2-($\Delta$1)-alkenyl-aromatic compounds which may be used as reactants are styrene, alpha-methyl-styrene, alpha-ethyl-styrene, ortho-methyl-styrene, meta-methyl-styrene, para-methyl-styrene, ortho-ethyl-styrene, meta-ethyl-styrene, para-isopropyl-styrene, orthochloro-styrene, meta-chloro-styrene, para-chlorostyrene, vinyl-naphthalene, vinyl-ethyl-naphthalene, etc. Because of its availability and low cost, styrene is preferred, but certain of the other 2-($\Delta$1)-alkenyl-aromatic compounds, particularly alpha-methyl-styrene, yield products which are equally resistant to abrasion and which appear to be slightly superior in certain other respects, e. g. in tensile strength, to the products prepared by co-polymerizing styrene with the other essential starting materials under otherwise similar conditions. A peculiarity noted in this respect was that although alpha-methyl-styrene alone is known to be far more difficult to polymerize than styrene and special methods for its polymerization have been proposed, alpha-methyl-styrene may be co-polymerized almost as readily as styrene with a diolefine and an unsaturated ketone to form the rubber-like products.

Among the various alpha-beta unsaturated ketones which may be used in the invention are methyl vinyl ketone, ethyl vinyl ketone, methyl isopropenyl ketone, methyl alpha-ethyl-vinyl ketone, isopropyl vinyl ketone, etc. Methyl isopropenyl ketone is preferred.

Although the necessary polymerizable compounds may be co-polymerized in the presence or absence of solvents or diluents in accordance with any of several known polymerization procedures, they are most satisfactorily co-polymerized while in aqueous emulsion. In practice, the diolefine, the 2-($\Delta$1)-alkenyl-aromatic compound and the unsaturated ketone, in the relative proportions hereinbefore specified, are admixed with an aqueous solution of an emulsifying agent and the mixture is agitated to effect emulsification. A variety of emulsifying agents such as egg albumen, soaps, sulphonic acids of aliphatic and alkyl-aromatic hydrocarbons of high molecular weight, sodium or potassium salts of such sulphonic acids, alkali metal salts of the monoesters of sulphuric acid and higher aliphatic alcohols, etc., which may be used in preparing such emulsions are well known. The smoothness and the rate of completeness of the polymerization reaction and also the proportion of emulsifying agent required to form the emulsion vary somewhat, of course, with different emulsifying agents. The sulphonate and sulphate ester types of emulsifying agents have proven to be most satisfactory and are preferred. They are usually employed in small proportion, e. g. in amount corresponding to between 1 and 3.5 per cent by weight of the water present, but they may be used in larger amounts if desired. A small proportion of a polymerization accelerator such as hydrogen peroxide, benzoylperoxide, sodium persulphate, potassium persulphate, or sodium perborate and a polymerization director, e. g. a polychlorinated hydrocarbon such as pentachloroethane, hexachloroethane, or hexachlorobenzene, etc., may advantageously be added to promote the polymerization. An alkali metal persulphate is particularly effective and is preferably used together with one of the polymerization directors just mentioned.

The emulsion is warmed in a closed container to a temperature between about 30° and 100° C., preferably between 50° and 70° C. to effect the polymerization. The reaction usually is substantially complete after from 10 hours to 3 days of heating.

The product may be recovered from the emulsion in any of the usual ways, e. g. by coagulation or by evaporation of the water. It usually resembles uncured rubber and may be compounded with usual rubber-compounding agents, e. g. carbon black, fillers, antioxidants, accelerators, vulcanizing agents, etc., and cured to obtain a synthetic rubber of good quality which is exceptionally resistant to wear by abrasion.

The following examples describe certain ways in which the invention has been practiced, but are not to be construed as limiting its scope.

EXAMPLE 1

In each of a series of experiments, a total of 8 parts by weight of butadiene, methyl isopropenyl ketone, and styrene in the relative proportions given in the following table were admixed with 1.5 parts of an aqueous solution of aliphatic ester sulphate (i. e. oil ester sulphate) and 8.5 parts of an aqueous solution which contained 1 per cent by weight of Aquarex D (i. e, the mono-sodium sulphate esters of a mixture of higher fatty alcohols, principally lauryl and myristic alcohols), 1 per cent of Santomerse No. 3 (i. e. an alkali metal salt of dodecyl benzene sulphonate), 0.5 per cent of sodium bicarbonate and 0.15 per cent of potassium persulphate. The mixture was agitated to effect emulsification and the emulsion was heated with agitation in a closed container at 60° C. for approximately 20 hours, whereby polymerization was effected. After completing the heating operations, the container was opened and water was evaporated (under vacuum) from the emulsion. The residual rubbery product was heated for about 2 hours at 100° C. and at pressures which were gradually reduced to about 20 millimeters absolute pressure in order to vaporize any volatile ingredients therefrom. Each co-polymer so-prepared was compounded with 50 per cent of its weight of carbon black, 10 per cent of zinc oxide, 3 per cent of sulphur, 2 per cent of pine tar, 2 per cent of rosin, and 0.1 per cent of mercaptothiazole. The compounded material was rolled into a sheet and cured by heating under pressure at 148° C. for 20 minutes. Test strips were cut from the sheet and were used in determining the resistance of the product to abrasion in accordance with the method described by I. Williams in Ind. Eng. Chem. 19, 674–677 (1927). Table I identifies each product by giving the relative proportions of butadiene, methyl isopropenyl ketone and styrene which were polymerized together in preparing it and the amount of material lost by abrasion under standard test conditions expressed as cubic centimeters of the product per horse power hour of applied energy. For purposes of comparison, the abrasion value of a sample of natural rubber which had been devolatilized, compounded and cured as above described is included in the table.

Table I

| Run No. | Starting materials | | | Abrasion c. c./H. P. hr. |
|---|---|---|---|---|
| | Butadiene, percent | Methyl isopropenyl ketone, percent | Styrene, percent | |
| 1 | 30 | 50 | 20 | 396 |
| 2 | 35 | 45 | 20 | 275 |
| 3 | 37.5 | 50 | 12.5 | 180 |
| 4 | 40 | 35 | 25 | 125 |
| 5 | 40 | 30 | 30 | 187 |
| 6 | 44 | 53 | 3 | 138 |
| 7 | 50 | 35 | 15 | 115 |
| 8 | 60 | 25 | 15 | 182 |
| 9 | 70 | 15 | 15 | 286 |
| 10 | Natural rubber | | | 200 |

In the foregoing table it will be noted that the products having abrasion values below 200, i. e. the products which are superior to similarly compounded and cured samples of natural rubber, are those containing more than 37 per cent and less than 70 per cent of butadiene and that as the proportion of butadiene combined in the product approaches either of these values, the resistance to abrasion decreases sharply. Runs 4 and 5 illustrate the fact that as the proportion of styrene combined in the product approaches the upper limit of 30 per cent which is permitted by the invention, the resistance to abrasion decreases sharply even though the proportion of butadiene combined in the product be constant.

EXAMPLE 2

A purpose of this example is to demonstrate that as the proportions of styrene chemically combined in the co-polymer product is increased from 0 to 0.12 part per part of the butadiene (or in other words, from 0 to 5 per cent of the weight of the co-polymer product) the resistance to abrasion increases sharply. The example also shows that the co-polymers provided by the invention are more resistant to abrasion than are the corresponding co-polymers of butadiene with either methyl isopropenyl ketone alone or with styrene alone. A series of rubber-like co-polymerizable compounds named in Table II in the proportions given were compounded, cured and tested for abrasion as in Example 1. The table identifies each co-polymer by giving the per cent by weight of chemically combined butadiene, methyl isopropenyl ketone and styrene making up the same and it gives the abrasion in cubic centimeters per horse power hour of the compounded and cured copolymer under the standard test conditions.

Table II

| Run No. | Co-polymer composition | | | Abrasion c. c./H. P. hr. |
|---|---|---|---|---|
| | Parts of $C_4H_6$ | Parts of methyl isopropenyl ketone | Parts of styrene | |
| 1 | 1 | | 0.33 | 403 |
| 2 | 1 | 1.2 | | 180 |
| 3 | 1 | 1.2 | 0.02 | 179 |
| 4 | 1 | 1.2 | 0.07 | 138 |
| 5 | 1 | 1.2 | 0.12 | 108 |

EXAMPLE 3

In Examples 1 and 2 it has been shown that as the composition of the products are varied so as to closely approach the outer limits permitted by the invention, the resistance to abrasion decreases sharply. This example is submitted to show that within the preferred limits of the invention, i. e. when the co-polymer is composed of between 38 and 60 per cent of butadiene, between 25 and 45 per cent of methyl isopropenyl ketone and between 5 and 25 per cent of styrene, the resistance to abrasion of the product depends largely upon the proportion of butadiene in the co-polymer and only to a minor extent upon the relative proportions of the methyl isopropenyl ketone and the styrene. In each of a series of experiments butadiene, methyl isopropenyl ketone and styrene in the proportions given in Table III were emulsified with water, co-polymerized while in emulsion, and the co-polymer product was separated, devolatilized, compounded, cured and tested for abrasion as in Example 1. The yield of the devolatilized co-polymer was 90 per cent of theoretical or higher in each of the experiments. Table III gives the proportion of each of the polymerizable starting materials as per cent of the combined weight of the polymerizable compounds and gives the abrasion, in cubic centimeters per horse power hour, suffered by the compounded and cured product under the standard test conditions mentioned in Example 1.

*Table III*

| Run No. | Starting materials | | | Abrasion c. c./H. P. hr. |
|---|---|---|---|---|
| | Butadiene, per cent | Methyl isopropenyl ketone, per cent | Styrene, per cent | |
| 1 | 50 | 45 | 5 | 127 |
| 2 | 50 | 40 | 10 | 110 |
| 3 | 50 | 35 | 12 | 115 |
| 4 | 50 | 30 | 20 | 127 |
| 5 | 60 | 35 | 5 | 156 |
| 6 | 60 | 25 | 15 | 182 |

EXAMPLE 4

In a series of runs, mixtures of butadiene, methyl isopropenyl ketone, and alpha-methyl-styrene were polymerized and the co-polymer products were separated, devolatilized, compounded, cured, and the abrasion properties of the cured products were determined as in Example 1. Table IV gives the proportions of each of the polymerizable starting materials as per cent of the combined weight of the polymerizable starting materials, and the abrasion, in cubic centimeters per horse power hour, of the compounded and cured products. One experiment, wherein the proportion of butadiene in the co-polymer was slightly less than the amount required by the invention, is included to illustrate the resultant sharp decrease in abrasion-resistance.

*Table IV*

| Run No. | Starting materials | | | Per cent yield | Abrasion c. c./H. P. hr |
|---|---|---|---|---|---|
| | Butadiene, per cent | Methyl isopropenyl ketone, per cent | α-methyl styrene, per cent | | |
| 1 | 44 | 51 | 5 | 100 | 144 |
| 2 | 41 | 49 | 10 | 96 | 115 |
| 3 | 40 | 45 | 15 | 97 | 185 |
| 4 | 35 | 40 | 25 | 86 | 245 |

The invention may be practiced in ways other than those described in the foregoing detailed examples. For instance, in place of the particular polymerizable compounds used as starting materials in the examples, the other conjugated diolefines, 2-(Δ1)-alkenyl-aromatic compounds and alpha-beta unsaturated ketones hereinbefore mentioned may be used in making the products. Also, a mixture of two or more diolefines, 2-(Δ1)-alkenyl-aromatic compounds, or unsaturated ketones, e. g. a mixture of butadiene and isoprene or a mixture of styrene and alpha-methyl styrene, may be used instead of a single such ingredient in preparing the co-polymerized products, provided of course that the ratio between the diolefines, the 2-(Δ1)-alkenyl-aromatic compounds and the unsaturated ketones is within the limits required by the invention. Furthermore, although the employment of one or more diolefines, 2-(Δ1)-alkenyl-aromatic compounds, and alpha-beta unsaturated ketones in the proportions hereinbefore specified is required in order to obtain the abrasion-resistant rubber-like products, the presence of other polymerizable organic compounds in minor proportions, e. g. in amount less than 5 per cent of the combined weight of the polymerizable compounds in the mixture, is not excluded. The presence of such small proportions of other polymerizable compounds such as vinyl cyanide, or methyl methyacrylate, etc., does not prevent the production of a polymeric product which is highly resistant to abrasion and in some instances improves certain of the properties of the product.

Other modes of applying the principle of the invention may be employed instead of those explained, change being made as regards the new polymeric products herein disclosed, provided the ingredients or ingredient stated in any of the following claims or the equivalent of such stated ingredients or ingredient be employed.

I therefore particularly point out and distinctly claim as my invention:

1. A rubber-like co-polymer consisting essentially of a conjugated diolefine, a 2-(Δ1)-alkenyl-aromatic compound having not more than 4 carbon atoms in the alkenyl radical and an unsaturated ketone having the general formula:

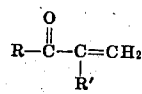

wherein R represents an alkyl radical and R' represents a member of the group consisting of hydrogen and alkyl radicals, interpolymerized in the proportions of between 37 and 65 per cent by weight of the diolefine, between 1 and 30 per cent of the 2-(Δ1)-alkenyl-aromatic compound, and between 20 and 60 per cent of the ketone.

2. A rubber-like co-polymer consisting essentially of a conjugated diolefine, a 2-(Δ1)-alkenyl-aromatic compound having not more than 4 carbon atoms in the alkenyl radical, and an unsaturated ketone having the general formula:

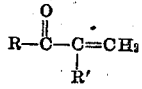

wherein R represents an alkyl radical and R' represents a member of the group consisting of hydrogen and alkyl radicals, which ingredients are interpolymerized in the proportions of between 38 and 60 per cent of the diolefine, between 5 and 25 per cent of the 2-(Δ1)-alkenyl-aromatic compound and between 25 and 45 per cent of the ketone.

3. A rubber-like co-polymer consisting essentially of butadiene, a 2-(Δ1)-alkenyl aromatic compound having not more than 4 carbon atoms in the alkenyl radical, and an unsaturated ketone having the general formula:

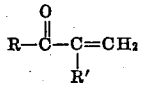

wherein R represents an alkyl radical and R' represents a member of the group consisting of hydrogen and alkyl radicals, which ingredients are interpolymerized in the proportions of between 38 and 60 per cent of butadiene, between 5 and 25 per cent of the 2-(Δ1)-alkenyl-aromatic compound, and between 25 and 45 per cent of the ketone.

4. A rubber-like co-polymer consisting essentially of butadiene, styrene, and an unsaturated ketone having the general formula:

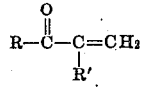

wherein R represents an alkyl radical and R' represents a member of the group consisting of hydrogen and alkyl radicals, which ingredients are interpolymerized in the proportions of between 38 and 60 per cent of the butadiene, between 5 and 25 per cent of styrene, and between 25 and 45 per cent of the ketone.

5. A rubber-like co-polymer consisting essentially of butadiene, alpha-methyl-styrene, and an unsaturated ketone having th general formula:

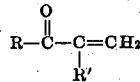

wherein R represents an alkyl radical and R' represents a member of the group consisting of hydrogen and alkyl radicals, which ingredients are interpolymerized in the proportions of 38 and 60 per cent of butadiene, between 5 and 25 per cent of alpha-methyl-styrene, and between 25 and 45 per cent of the ketone.

6. A rubber-like co-polymer consisting essentially of a conjugated diolefine, a 2-(Δ1)-alkenyl-aromatic compound having not more than 4 carbon atoms in the alkenyl radical, and methyl isopropenyl ketone, which ingredients are interpolymerized in the proportions of between 38 and 60 per cent of the diolefine, between 5 and 25 per cent of the 2-(Δ1)-alkenyl-aromatic compound, and between 25 and 45 per cent of methyl isopropenyl ketone.

7. A rubber-like co-polymer consisting essentially of butadiene, styrene, and methyl isopropenyl ketone interpolymerized in the proportions of between 38 and 60 per cent of butadiene, between 5 and 25 per cent of styrene, and between 25 and 45 per cent of methyl isopropenyl ketone.

8. A rubber-like co-polymer consisting essentially of butadiene, alpha-methyl-styrene, and methyl isopropenyl ketone interpolymerized in the proportions of between 38 and 60 per cent of butadiene, between 5 and 25 per cent of alpha methyl styrene, and between 25 and 45 per cent of methyl isopropenyl ketone.

9. An abrasion-resistant rubber-like product consisting essentially of the co-polymer described in claim 1 compounded with rubber-compounding agents and vulcanized.

10. An abrasion-resistant rubber-like product consisting essentially of the co-polymer described in claim 2 compounded with rubber-compounding agents and vulcanized.

11. An abrasion-resistant rubber-like product consisting essentially of the co-polymer described in claim 3 compounded with rubber-compounding agents and vulcanized.

12. An abrasion-resistant rubber-like product consisting essentially of the co-polymer described in claim 4 compounded with rubber-compounding agents and vulcanized.

13. An abrasion-resistant rubber-like product consisting essentially of the co-polymer described in claim 5 compounded with rubber-compounding agents and vulcanized.

14. An abrasion-resistant rubber-like product consisting essentially of the co-polymer described in claim 6 compounded with rubber-compounding agents and vulcanized.

15. An abrasion-resistant rubber-like product consisting essentially of the co-polymer described in claim 7 compounded with rubber-compounding agents and vulcanized.

16. An abrasion-resistant rubber-like product consisting essentially of the co-polymer described in claim 8 compounded with rubber-compounding agents and vulcanized.

ROBERT R. DREISBACH.